United States Patent
Tin et al.

(10) Patent No.: US 11,212,283 B2
(45) Date of Patent: Dec. 28, 2021

(54) METHOD FOR AUTHENTICATION AND AUTHORIZATION AND AUTHENTICATION SERVER USING THE SAME FOR PROVIDING USER MANAGEMENT MECHANISM REQUIRED BY MULTIPLE APPLICATIONS

(71) Applicant: Wistron Corporation, New Taipei (TW)

(72) Inventors: Hsiao-Wen Tin, New Taipei (TW); Tsung-Cheng Chiang, New Taipei (TW); Yen-Chuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 396 days.

(21) Appl. No.: 16/279,935

(22) Filed: Feb. 19, 2019

(65) Prior Publication Data

US 2020/0145421 A1 May 7, 2020

(30) Foreign Application Priority Data

Nov. 5, 2018 (TW) .................................. 107139141

(51) Int. Cl.
*H04L 29/06* (2006.01)
*H04L 9/08* (2006.01)
*H04L 9/06* (2006.01)

(52) U.S. Cl.
CPC ........ *H04L 63/0892* (2013.01); *H04L 9/0618* (2013.01); *H04L 9/0866* (2013.01);
(Continued)

(58) Field of Classification Search
CPC ...... G06F 21/54; G06F 21/6281; G06F 9/542; G06F 9/3836; G06F 9/35
(Continued)

(56) References Cited

U.S. PATENT DOCUMENTS 7,334,254 B1 * 2/2008 Boydstun .............. H04L 63/105
726/1
7,823,192 B1 * 10/2010 Fultz ...................... G06F 21/33
726/7
(Continued)

FOREIGN PATENT DOCUMENTS

| CN | 103051630 | 4/2013 |
|---|---|---|
| CN | 103609090 | 2/2014 |

(Continued)

OTHER PUBLICATIONS

"Office Action of Taiwan Counterpart Application", dated Oct. 17, 2019, p. 1-p. 14.
(Continued)

*Primary Examiner* — Bryan F Wright
(74) *Attorney, Agent, or Firm* — JCIPRNET (57) ABSTRACT

The embodiments of the disclosure provide a method for authentication and authorization and the authentication server. The disclosure provides a user management mechanism required by multiple applications, so each of the applications does not need to have its own user management mechanism. In this manner, the security mechanism can be provided by the authentication server to improve the security of the user data.

18 Claims, 2 Drawing Sheets

(52) U.S. Cl.
CPC ...... *H04L 63/0807* (2013.01); *H04L 63/0884* (2013.01); *H04L 63/102* (2013.01); *H04L 63/105* (2013.01); *H04L 2209/38* (2013.01)

(58) Field of Classification Search
USPC .......................................................... 726/8
See application file for complete search history.

(56) References Cited

U.S. PATENT DOCUMENTS

| | | | |
|---|---|---|---|
| 8,424,077 B2 | 4/2013 | Adams et al. | |
| 8,875,242 B2* | 10/2014 | Choi | H04L 63/10 |
| | | | 726/4 |
| 9,847,990 B1* | 12/2017 | de Boursetty | H04L 9/3236 |
| 2008/0148373 A1 | 6/2008 | Adams et al. | |
| 2014/0331240 A1* | 11/2014 | Zhao | G06F 9/541 |
| | | | 719/328 |

FOREIGN PATENT DOCUMENTS

| | | |
|---|---|---|
| CN | 104468518 | 3/2015 |
| TW | 200828944 | 7/2008 |

OTHER PUBLICATIONS

"Office Action of China Counterpart Application", dated Oct. 11, 2021, p. 1-p. 15.

* cited by examiner

METHOD FOR AUTHENTICATION AND AUTHORIZATION AND AUTHENTICATION SERVER USING THE SAME FOR PROVIDING USER MANAGEMENT MECHANISM REQUIRED BY MULTIPLE APPLICATIONS

CROSS-REFERENCE TO RELATED APPLICATION

This application claims the priority benefit of Taiwan application serial no. 107139141, filed on Nov. 5, 2018. The entirety of the above-mentioned patent application is hereby incorporated by reference herein and made a part of this specification.

BACKGROUND

Field of the Disclosure

The present disclosure relates to a method for authentication and authorization and an authentication server, and more particularly to a method for authentication and authorization and an authentication server capable of authorizing an application to invoke an application programming interface after authenticating a user and an application are valid.

Description of Related Art

For modern people, running applications on smart devices has become a part of life. However, some applications require users to register before use, and this mechanism may impose a burden on the user.

Specifically, as the number of such applications requiring registration increases, users may need to remember multiple sets of login information (such as user names and passwords). In this case, not only that burden is likely to increase on user's memory, developers of various applications also need to set up a corresponding user management database to manage information related to the user. Moreover, the above mechanism may also increase the risk of user data being stolen by hackers.

Therefore, it is an important issue for a person skilled in the art to design a better user management mechanism.

SUMMARY

In view of this, the present disclosure proposes a method for authentication and authorization method and an authentication server thereof, which may be used to solve the above technical problems.

The present disclosure provides a method for authentication and authorization adapted for an authentication server. The method includes: receiving a login information from a first application; in response to authenticating that the login information is valid, generating a user token, and sending the user token to the first application; receiving a first request of the first application for invoking the first application programming interface, wherein the first request includes a user token, a first identity of the first application, and a first key of the first application; in response to authenticating that the user token, the first identity and the first key are valid, generating a first application token associated with the first application; and sending the first application token to the first application to authorize the first application to invoke the first application programming interface.

The disclosure provides an authentication server including a storage circuit and a processor. The storage circuit stores a plurality of modules. The processor is coupled to the storage circuit and accesses the module to perform the following steps: receiving a login information from a first application; in response to authenticating that the login information is valid, generating a user token, and sending the user token to the first application; receiving a first request of the first application for invoking the first application programming interface, wherein the first request includes a user token, a first identity of the first application, and a first key of the first application; in response to authenticating that the user token, the first identity and the first key are valid, generating a first application token associated with the first application; and sending the first application token to the first application to authorize the first application to invoke the first application programming interface.

Based on the above, the method for authentication and authorization and the authentication server thereof provided by the present disclosure may assist the application to authenticate whether the user is valid, and correspondingly send the user token to the application after determining that the user is valid. Then, when the application is to invoke the application programming interface, the application may send its own identity, key, and user token to the authentication server for the authentication server to verify that the application is valid. If so, the authentication server may authorize the application to invoke the desired application programming interface. In this manner, the application does not need to have its own user management mechanism, thereby improving the security of user data.

In order to make the aforementioned features and advantages of the disclosure more comprehensible, embodiments accompanying figures are described in detail below.

DESCRIPTION OF EMBODIMENTS

Figure 1:
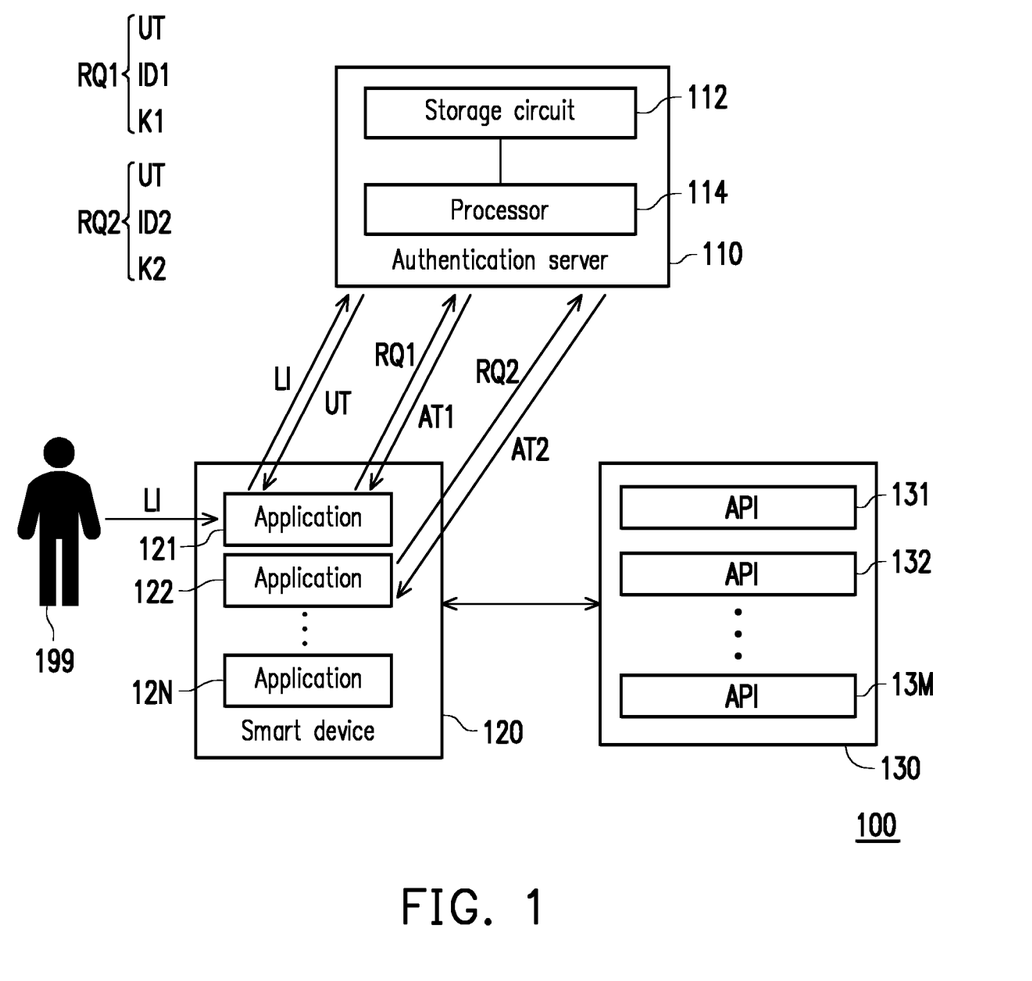
FIG. 1 is a schematic view of an authentication system according to an embodiment of the disclosure.

Please refer to FIG. 1, which is a schematic view of an authentication system according to an embodiment of the disclosure. As shown in FIG. 1, an authentication system 100 includes an authentication server 110, a smart device 120 and an application programming interface pool (API pool) 130. In this embodiment, the authentication server 110 may, for example, assist a plurality of applications to centrally manage user information, so that the user can log in to multiple applications by using a single set of login information (for example, a user name and password), and can also manage permissions for multiple applications. In this case, the burden on the user to memorize the login information can be reduced, and at the same time, the security of the user data can be improved.

In FIG. 1, the authentication server 110 may include a storage circuit 112 and a processor 114. The storage circuit 112 is, for example, any type of fixed or movable random access memory (RAM), a read-only memory (ROM), a flash memory, a hard disc or other similar device or combination of these devices for recording a plurality of program codes or modules.

The processor 114 is coupled to the storage circuit 112 and may be a general-purpose processor, a specific-purpose processor, a conventional processor, a digital signal processor, a plurality of microprocessors, one or more microprocessors combined with digital signal processor core, a controller, a microcontroller, an Application Specific Integrated Circuit (ASIC), a Field Programmable Gate Array (FPGA), any other kinds of integrated circuit, a state machine, a processor based on Advanced RISC Machine (ARM) and similar products.

The smart device 120 is, for example, a mobile phone, a smart phone, a personal computer (PC), a notebook computer (notebook PC), a netbook PC, a tablet PC, etc., which can be operated by the user 199, but not limited thereto. The smart device 120 may be provided with applications 121, 122, . . . 12N. The applications 121-12N may assist in managing the data of the user 199 through the authentication server 110, so that the user 199 can log in to the applications 121-12N through the same set of login information.

In addition, in order to implement the above functions, the user 199 may first register with the authentication server 110 through the relevant management page (for example, a webpage) provided by the authentication server 110, and the authentication server 110 may record the user account information (such as birthday, user name, password, address, phone number, etc.) input by the user 199 during the registration process into the database as a basis for determining whether the user 199 is valid in the future.

A plurality of APIs 131, 132, . . . , 13M may be stored in the API pool 130. In the embodiment of the present disclosure, one or more of the APIs 131-13M may be invoked by the applications 121-12N to implement the specified functions according to functions/requirements/permissions. For example, the application 121 may be authorized to invoke API 131, and the application 122 may be authorized to invoke APIs 131 and 132. In other words, the APIs 131-13M in the API pool 130 may be shared by the applications 121-12N instead of being dedicated to one application, and the authentication server 110 further manages the permissions of multiple applications for invoking APIs. In addition, in different embodiments, the API pool 130 may be stored in a network device in the cloud network or integrated in the authentication server 110. For ease of explanation, it is assumed below that the API pool 130 is stored in another device independent of the authentication server 110, but is not intended to limit the possible embodiments of the present disclosure.

In an embodiment of the disclosure, the processor 114 may load the program code or module recorded in the storage circuit 112 to perform the method for authentication and authorization proposed by the present disclosure, as further described below.

Figure 2:
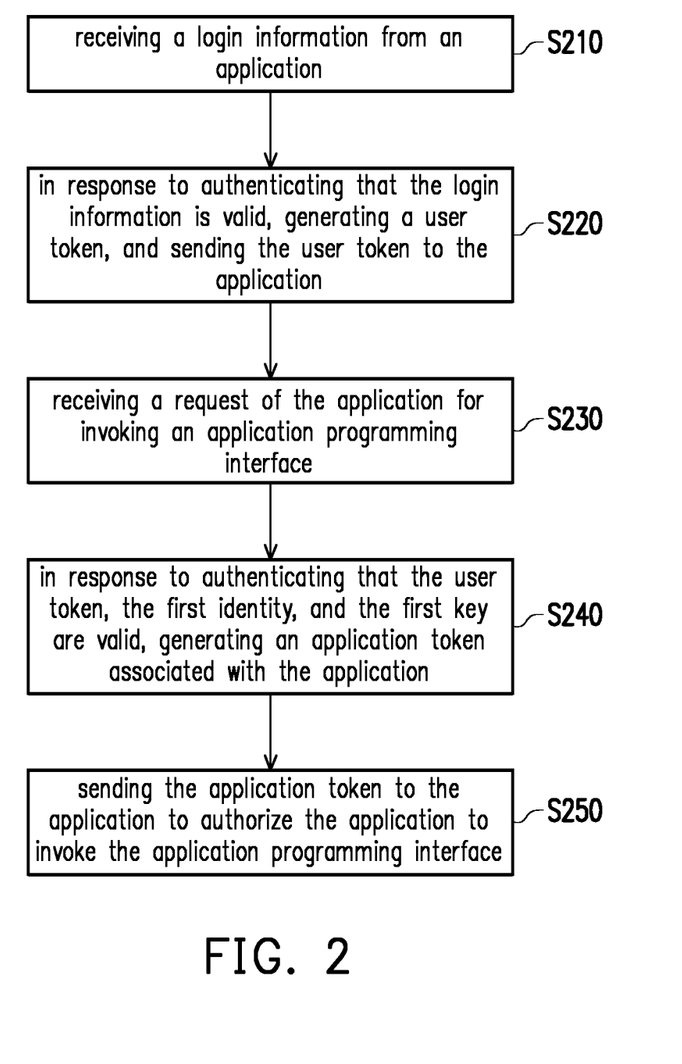
FIG. 2 is a flow chart of a method for authentication and authorization according to an embodiment of the present disclosure.

Please refer to FIG. 2, which is a flowchart of a method for authentication and authorization according to an embodiment of the present disclosure. The method in FIG. 2 may be performed by the authentication server 110 in FIG. 1, and the details of the steps in FIG. 2 are described below with reference to the elements in FIG. 1. In the following descriptions, it is assumed that the user 199 intends to log into the application 121 to use the functions provided by the application 121, which is not intended to limit the possible embodiments of the present disclosure.

First, in step S210, the processor 114 may receive the login information LI from the application 121. In the present embodiment, the login information LI may be input to the application 121 by the user 199, and may include the user name and password used by the user 199 when registering on the authentication server 110 previously, and the application 121 may forward the login information LI to the authentication server 110 after receiving the same.

Correspondingly, the processor 114 may look up in the above database whether there is user data matching the login information LI. If so, the processor 104 may determine that the login information LI is valid. If there is no user data matching the login information LI in the database, the processor 104 may determine that the login information LI is invalid.

Next, in step S220, in response to authenticating that the login information LI is valid, the processor 104 may generate a user token UT and send the user token UT to the application 121. In the present embodiment, the user token UT may be time-sensitive, which may allow the user 199 to control the application 121 to issue a request for invoking the API within a period of time, but the present disclosure is not limited thereto. In addition, the user token UT may also be sent to the applications 122-12N, so that the applications 122-12N issue a request for invoking the API within the time limit of the user token UT. In other words, the user 199 only needs to log in once at the application 121 to obtain the user token UT, and the user token UT may be used to allow the applications 121-12N to issue a request for invoking the API. In this case, when the user 199 is to use the functions of the applications 122-12N, there is no need to perform login operations repeatedly on the applications 122-12N. In this manner, the present disclosure can improve the user's operating experience by reducing unnecessary login operations.

In other embodiments, the user 199 only needs to perform the login operation once in one of the applications 121-12N to obtain the user token UT shared by the applications 121-12N.

In step S230, the processor 114 may receive the request RQ1 of the application 121 for invoking the API, wherein the request RQ1 may include the user token UT, the identity ID1 of the application 121, and the key K1 of the application 121.

In this embodiment, the application 121 may invoke different APIs depending on the functions required by the user 199. For example, assume that the API 131 may be used to perform motion detection, while the API 132 may be used to perform face recognition. In this case, when the user 199 requests the application 121 to provide the function of motion detection by changing the configuration of the application 121, the application 121 may issue the request RQ1 for invoking the API 131 correspondingly. In addition, when the user 199 requests the application 121 to simultaneously provide the functions of motion detection and face recognition, the application 121 may correspondingly issue the request RQ1 for invoking the APIs 131 and 132, respectively, but the present disclosure is not limited thereto.

In an embodiment, after the developer completes the development of an application, if the developer wants the authentication server to assist in managing the user data of the application, or the developer wants the developed application to invoke one of the APIs 131 to 13M in the API pool 130, the developer may register the application on the authentication server 110 through the management page provided by the authentication server 110. For example, the authentication server 110 may receive a request from the developer to apply for a development account of the aforementioned application. In the process of registering the development account, the authentication server 110 may request the developer to input relevant contact information and basic information of the application. The aforementioned contact information is, for example, a telephone number and an email address. The above basic information is, for example, the version of the application (for example, the full version or the trial version), the platform of the application (such as Android, iOS, Windows, HTML5, etc.), the payment status, the name of the application, and related descriptions.

If the authentication server 110 determines that the information input by the developer during the registration process is correct, the authentication server 110 may correspondingly generate the identity and key of the application and send it to the developer. In an embodiment, the authentication server 110 may store the information input by the developer, the identity or the key of the application, and the like into the database.

For example, if a developer wants to register a baby monitoring application (which operates, for example, on the Android platform) on the management page of the authentication server 110, the developer may tick the Android platform, whether payment is required and the like during the registration process. Thereafter, after the authentication server 110 confirms that the information input by the developer is correct, the authentication server 110 may correspondingly generate the identity and key of the baby monitoring application, and provide the identity and key of the baby monitoring application to the developer. Thereafter, when the authentication server 110 receives the request (which includes the identity and key of the baby monitoring application) from the baby monitoring application for invoking the API, the authentication server 110 may correspondingly know that the baby monitoring application may be invoked and operated on the API on the Android platform. Moreover, the authentication server 110 may also determine the API that can be invoked according to the related information (for example, the payment status) of the baby monitoring application.

In addition, if the developer wants to additionally register a home security application (which runs on the iOS platform, for example) on the authentication server 110, the developer may tick the iOS platform, whether payment is required and other information during the registration process. Thereafter, after the authentication server 110 confirms that the information input by the developer is correct, the authentication server 110 can correspondingly generate the identity and key of the home security application, and provide the identity and key of the home security application to the developer. Then, when the authentication server 110 receives the request (which includes the identity and key of the home security application) from the home security application for invoking the API, the authentication server 110 can know that the home security application can invoke the API operated under the iOS platform accordingly. Moreover, the authentication server 110 may also determine the API that can be invoked according to related information (such as payment status) of the home security application.

Based on the above teachings, it should be known that when the developer of the application 121 registers the application 121 on the authentication server 110, the authentication server 110 generates the identity ID1 and the key K1 corresponding to the application 121 according to the related information of the application 121, and the identity ID1 and the key K1 are provided to the developer of the application 121.

For ease of explanation, it is assumed below that the request RQ1 of the application 121 is used to invoke the API 131, but the present disclosure is not limited thereto. In this case, the application 121 may use the identity ID and the key K1 as the header of the request RQ1, so that the processor 114 can determine whether the application 121 is a valid application registered on the authentication server 110. For example, the processor 114 may look up the database after extracting the identity ID1 and the key K1 from the header of the request RQ1. If there is an application matching the identity ID1 and the key K1 in the database, and the application has the permission to invoke the API 131, the processor 114 can determine that the identity ID1 and the key K1 are valid. That is, the application 121 is a valid application that has been previously registered on the authentication server 110, and has the permission to invoke the API 131.

In addition, since the request RQ1 also includes the user token UT, the processor 114 can also correspondingly authenticate whether the user token UT is valid or not. Specifically, as described in the previous embodiments, the user token UT may be time-sensitive, and therefore the processor 114 may authenticate whether the user token UT is valid by determining whether the user token UT is still within its time limit. If the user token UT is still within its time limit, the processor 114 can determine that the user token UT is valid, and vice versa.

Thereafter, in step S240, in response to authenticating that the user token UT, the identity ID1, and the key K1 are valid, the processor 114 may generate the application token AT1 associated with the application 121. Moreover, in step S250, the processor 114 may send the application token AT1 to the application 121 to authorize the application 121 to invoke the API 131.

After the application 121 receives the application token AT1, the API 131 may be invoked from the API pool 130 by the application 121 according to the application token AT1 to implement the required functions (such as motion detection).

As can be seen from the above, the authentication server 110 can provide the user management mechanism required by the application 121, so the application 121 does not need to have its own user management mechanism. In this case, the user's account information is stored on the authentication server 110 instead of the server of the application 121. In this manner, the security mechanism can be provided by the authentication server 110 to improve the security of the user data.

In addition, as mentioned in the previous embodiment, the authentication server 110 not only can send the user token UT to the application 121 in response to the login information LI, but also can send the user token UT to the applications 121-12N. Therefore, when the user 199 wants to operate any one of the applications 122 to 12N, the user 199 does not need to input the login information LI again.

For example, assuming that the user 199 wants to use the face recognition function provided by the application 122, the application 122 may correspondingly send a request RQ2 for invoking the API 132 (which has the face recognition function) to the authentication server 110. In this example, the request RQ2 may include the user token UT, the identity ID2 of the application 122, and the key K2 of the application 122.

Similar to the identity ID1 and the key K1, the identity ID2 of the application 122 and the key K2 of the application 122 may also be generated by the authentication server 110 after the developer of the application 122 registers the application 122 on the authentication server 110, related details may be derived from the previous embodiments, and thus no further descriptions are incorporated herein.

Thereafter, the application 122 may use the identity ID2 and the key K2 as the header of the request RQ2, so that the processor 114 can determine whether the application 122 is a valid application registered on the authentication server 110. For example, the processor 114 may look up the database after extracting the identity ID2 and the key K2 from the header of the request RQ2. If there is an application that matches the identity ID2 and the key K2 in the database and the application has the permission to invoke the API 132, the processor 114 can determine that the identity ID2 and the key K2 are valid. That is, the application 122 is a valid application that has been previously registered on the authentication server 110 and has the permission to invoke the API 132.

In addition, since the request RQ2 also includes the user token UT, the processor 114 may also correspondingly authenticate whether the user token UT is valid or not. Specifically, as described in the previous embodiments, the user token UT may be time-sensitive, and therefore the processor 114 may authenticate whether the user token UT is valid by determining whether the user token UT is still within its time limit. If the user token UT is still within its time limit, the processor 114 can determine that the user token UT is valid, and vice versa.

Thereafter, in response to authenticating that the user token UT, the identity ID 2, and the key K2 are valid, the processor 114 can generate an application token AT2 associated with the application 122. Moreover, the processor 114 may send the application token AT2 to the application 122 to authorize the application 122 to invoke the API 132.

After the application 122 receives the application token AT2, the API 132 may be invoked from the API pool 130 by the application 122 according to the application token AT2 to implement the desired function (e.g., face recognition).

It should be understood that although the above applications 121 and 122 are merely illustrative examples, other applications in the smart device 120 may operate based on the same mechanism. In other words, the authentication server 110 may centrally manage the user data of the applications 121-12N, so the applications 121-12N do not need to set their own user management mechanism. For the user 199, only one set of login information LI needs to be memorized, thereby reducing the burden on the user's memory. Moreover, after the user 199 inputs the login information LI into one of the applications 121-12N, if the user 199 wants to use another one of the applications 121-12N, the user 199 can directly use the function of said another one of the applications without having to inputting the login information LI again, so that the operational convenience can be increased.

In an embodiment, the application token AT1 may also be time-sensitive, and when the application token AT1 fails (e.g., exceeds a specified time or number of uses), the application 121 may invoke the API that can refresh application token AT1 from the API pool 130 to obtain a new application token AT1, or to extend the available time of the application token AT1. Thereafter, the application 121 may invoke the required API based on the new application token AT1.

Specifically, if the application 121 continues to use the same application token AT1 to invoke the API, the probability of being hacked will increase correspondingly. Therefore, timely refreshing the application token AT1 or extending the available time of the application token AT1 ensures that the application token AT1 remains in a protected state.

In addition, in an embodiment, since the disconnection may occur between the smart device 120 and the authentication server 110 for some reason, it may be required for the user 199 to input the login information LI again after the connection is resumed. In this case, the user 199 may have a poor operating experience due to repeated input of the login information LI.

In view of the foregoing, the present disclosure also proposes a corresponding mechanism to solve the above technical problem. Specifically, after the authentication server 110 authenticates that the user token UT, the identity ID1, and the key K1 are valid, the processor 114 may further generate a first specific key and a second specific key, where the first specific key corresponds to the second specific key. Moreover, the processor 114 may send the second specific key to the application 121. In an embodiment, the processor 114 may generate a pair of keys, namely the first specific key and the second specific key, based on an asymmetric cryptosystem technique. Further, after receiving the second specific key, the application 121 may store the second specific key in key caching.

In an embodiment, if a disconnection occurs between the smart device 120 and the authentication server 110, the application 121 may send the second specific key to the authentication server 110 after the smart device 120 is reconnected to the authentication server 110.

Thereafter, the processor 114 may determine whether the received second specific key matches the first specific key. If so, the processor 114 can maintain the validity of the user token UT and the application token AT1. If not, the processor 114 may request the user 199 to input the login information LI again.

In other words, if the second specific key sent by the application 121 after reconnecting to the authentication server 110 matches the first specific key recorded by the authentication server 110, the user 199 may not need to input the login information LI again, thereby increasing the operational convenience.

In one embodiment, the present disclosure further provides a mechanism for generating a set of user keys for the user 199 based on the concept of a blockchain after the user 199 inputs the login information LI for the first time. Thereafter, when the user 199 wants to log in to the application 121 again, the user 199 may not need to input the login information LI again, but only needs to use the user key to log in to the application 121. In this manner, the security of the data can be further increased.

Specifically, the processor 114 may generate a user key according to the login information LI, and generate the first block according to the user key, the identity ID1, and the key K1. Thereafter, the processor 114 may add the first block to a blockchain and send the user key to the application 121 for viewing by the user 199.

Thereafter, the user 199 can log in to the application 121 by the user key, and the application 121 may correspondingly send the user key, the identity ID1, and the key K1 to the authentication server 110. In response to receiving the user key, the identity ID1 and the key K1 from the application 121, the processor 114 may search for the first block based on the user key, the identity ID1 and the key K1 to authenticate whether the user 199 and a use behavior of the user 199 are valid. If the data stored in the first block matches the user key, the identity ID1 and the key K1 from the application 121, the processor 114 can determine that the use behavior of the application 121 and the user 199 corresponding to the use behavior are valid, and the user token UT is generated correspondingly, and vice versa.

In response to authenticating that user 199 is valid, the processor 114 may further record a use behavior, such as time of use, number of uses, and the like, of the user 199 using the application 121. Thereafter, the processor 114 may generate a second block according to the use behavior described above, and add the second block to the foregoing blockchain. In this manner, the application 121 can perform an operation such as charging to the user 199 based on the content recorded in the second block. Moreover, since the blockchain has the characteristic of being non-tamperable, the security of the data recorded in the first block and the second block can be ensured. In addition, since the user 199 may not need to input the login information LI again, the probability of leaking the login information LI can be reduced.

In other embodiments, the present disclosure further provides an access control mechanism that determines the permissions of an application to invoke an API according to the role of the application and/or the access level of the user. For ease of explanation, the application 121 is still described below as an example, which provides no limitation to the possible embodiments of the present disclosure.

In an embodiment, when the developer of the application 121 registers the application 121 on the authentication server 110, the processor 114 may assign one of the multiple access roles for the application 121 according to the information registered by the application 121 on the authentication server 110, wherein each of the access roles corresponds to different API invoking permissions. In this embodiment, the access role may include test access, basic access, and standard access.

For example, if the information input by the developer indicates that the application 121 is a trial version, the processor 114 may execute a policy administration (PA) module to correspondingly record the access role of the application 121 as a test access. In another example, if the information input by the developer indicates that the application 121 is a full version, the processor 114 may execute the PA module to correspondingly record the access role of the application 121 as standard access. However, the disclosure is not limited thereto.

In the above two examples, the application 121 having different access roles may have different API invoking permissions. For example, if the role of the application 121 is test access, when the user 199 requests the application 121 to provide the face recognition function, the application 121 may only be capable of invoking the basic API that determines whether the face is detected, but cannot invoke the high-level API that can specifically identify a specific face. However, if the role of the application 121 is standard access, when the user 199 requests the application 121 to provide the face recognition function, the application 121 may have the permission to simultaneously invoke the basic API for determining whether the face is detected as well as the high-level API capable of specifically recognizing a specific face, but the present disclosure is not limited thereto.

In addition, the above API invoking permission may also refer to the number of times an API is invoked within a time of window. For example, if the role of the application 121 is test access, the application 121 may only be allowed to invoke certain APIs ten times within a time of window (e.g., 30 seconds). If the role of the application 121 is basic access, the application 121, for example, may be allowed to invoke a wider variety of APIs within a time of window. If the role of the application 121 is standard access, the application 121 may invoke the above APIs at any time as needed without being limited by the time of window, but the present disclosure is not limited thereto.

In one embodiment, the processor 114 may record the application 121 and its access role as a specific data structure (referred to as a policy content (PC) module hereafter) for lookup.

Thereafter, when the authentication server 110 receives the request RQ1 for invoking the API 131, the processor 114 can look up the PC according to the identity ID1 to know the access role of the application 121. Thereafter, the processor 114 may execute a policy decision (PD) module and a policy enforcement (PE) module to determine whether the application 121 has permission to invoke the API 131 according to the access role of the application 121. Specifically, in this embodiment, the PD module may be used to determine which APIs in the API pool 130 that the application 121 has permission to invoke. The PE module may be used to check whether the application 121 has permission to invoke the API 131, and if so, the PE module can authorize the application 121 to invoke the API 131.

In response to determining that the application 121 has permission to invoke the API 131 and the user token UT is valid, the processor 114 can generate the application token AT1 correspondingly to allow the application 121 to invoke the API 131 accordingly.

For example, if the access role of the application 121 is test access, when the user 199 requests the application 121 to provide a basic face recognition function, the application 121 can correspondingly send a request RQ1. Thereafter, the PD module and the PE module can determine that the application 121 has the permission to invoke an API (e.g., API 131) which a basic face recognition function according to the access role of the application 121. Thereafter, the application 121 can be authorized to invoke the API 131 to provide the function needed by the user 199.

In the above example, when the user 199 requests the application 121 to provide a function for recognizing a specific face, the application 121 can send a request RQ1 correspondingly. Thereafter, the PD module and the PE module can determine that the application 121 have no permission to invoke an API (e.g., API 132) that has the function of recognizing a specific face according to the access role of the application 121. In this case, the application 121 cannot provide the functions required by the user 199, but the present disclosure is not limited thereto.

Moreover, in another embodiment, the concept of an access level is introduced in the above access control mechanism to implement a more flexible management strategy.

Roughly speaking, it is assumed that the aforementioned access roles such as test access, basic access, and standard access are preset to correspond to the access level 1, the access level 2, and the access level 3. In this case, when the access role of the application 121 installed by the user 199 is test access, it represents that the access level of the application 121 is the access level 1. Thereafter, when the user 199 upgrades the application 121 by means of payment or the like, the authentication server 110 can correspondingly change the access level of the application 121 into the access level 2.

In other words, the user 199 can use the function corresponding to the access level 2 without downloading another application (the identity and key of which are different from the identity ID1 and the key K1) of which the access role is basic access.

Specifically, the application 121 may send a level change request proposed by the user 199 to the authentication server 110. Correspondingly, the processor 114 can receive the level change request of the user 199 from the application 121, and change the access level of the access role (e.g., test access) of the application 121 from level 1 into access level 2, wherein the permission for invoking the application programming interface of the access level 2 is different from the permission for invoking the application programming interface of the access level 1. Thereafter, the processor 114 can record the corresponding relationship of the user 199, the identity ID of the application 121, the access role (such as test access) of the application 121, and the access level (for example, access level 2) of the application 121 through the PC module.

Then, when the authentication server 110 receives the request RQ1 of the application 121 for invoking the APIs 131 and 132, the processor 114 may, for example, look up the PC module according to the identity ID1 to obtain the access role (for example, test access) and the access level (access level 2) of the application 121.

Then, the processor 114 may determine whether the application 121 has permission to invoke the APIs 131 and 132 according to the access role and the access level of the application 121. It is assumed that access level 1 is only allowed to invoke the API 131, and the access level 2 is allowed to invoke the APIs 131 and 132. In this case, the processor 114 may determine through the PD module that the application 121 has permission to invoke the APIs 131 and 132.

In response to determining that the application 121 has permission to invoke the APIs 131 and 132 and the user token UT is valid, the processor 114 may generate the application token AT1 through the PE module to authorize the application 121 to invoke the APIs 131 and 132.

In other words, the application 121 before being upgraded has no permission to invoke the API 132 because it only has the access level 1. However, after the application 121 is upgraded, since the access level of the application 121 is upgraded to the access level 2, the application 121 has the permission to invoke the APIs 131 and 132 with the same access role.

In this manner, the authentication server 110 can manage the permissions of various applications for invoking the API more flexibly through the above access control mechanism.

In summary, the method for authentication and authorization and the authentication server provided by the present disclosure can provide a user management mechanism required by multiple applications, so each of the applications does not need to have its own user management mechanism. In this case, the user's account information is stored on the authentication server instead of the server of various applications. In this manner, the security mechanism can be provided by the authentication server to improve the security of the user data.

Moreover, for the user, only one set of login information needs to be memorized, thereby reducing the burden on the user's memory. Moreover, after the user inputs the login information into an application, if the user wants to use another application, the user can directly use the function of said another application without inputting the login information again, thereby increasing the convenience of operation.

In addition, the present disclosure also proposes an access control mechanism implemented based on an access role/access level of application, thereby enabling the authentication server to manage the permissions of various applications for invoking the API more flexibly.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A method for authentication and authorization adapted for an authentication server, comprising: receiving a login information from a first application; in response to authenticating that the login information is valid, generating a user token, and sending the user token to the first application; receiving a first request of the first application for invoking a first application programming interface, wherein the first request comprises the user token, a first identity of the first application, and a first key of the first application, wherein the first identity and the first key are assigned to the first application by the authentication server in response that the first application is registered on the authentication server; in response to authenticating that the user token, the first identity, and the first key are valid, generating a first application token associated with the first application; and sending the first application token to the first application to authorize the first application to invoke the first application programming interface.

2. The method according to claim 1, wherein after generating the user token, the method further comprises:
sending the user token to a second application, wherein the first application and the second application are installed on a smart device.

3. The method according to claim 2, wherein after the step of sending the user token to the second application, the method further comprises:
receiving a second request of the second application for invoking a second application programming interface, wherein the second request comprises the user token, a second identity of the second application, and a second key of the second application, wherein the second identity and the second key are assigned to the second application by the authentication server in response to that the second application is registered on the authentication server; and
in response to authenticating the user token, the second identity, and the second key are valid, generating a second application token associated with the second application, and sending the second application token to the second application to authorize the second application to invoke the second application programming interface.

4. The method according to claim 1, further comprising:
assigning a first access role of multiple access roles for the first application according to information registered on the authentication server by the first application, wherein each of the access roles corresponds to permissions for invoking different application programming interfaces.

5. The method according to claim 4, further comprising:
obtaining the first access role of the first application according to the first identity;
determining whether the first application has permission to invoke the first application programming interface according to the first access role;
in response to determining that the first application has permission to invoke the first application programming interface and the user token is valid, generating the first application token.

6. The method according to claim 4, wherein an access level of the first access role is a first level, and the method further comprises:

receiving a level change request from the first application;
changing the access level of the first access role into a second level according to the level change request, wherein a permission for invoking an application programming interface of the second level is different from a permission for invoking an application programming interface of the first level.

7. The method according to claim 6, further comprising:
obtaining the first access role and the access level of the first application according to the first identity;
determining, according to the first access role and the access level, whether the first application has permission to invoke the first application programming interface;
in response to determining that the first application has permission to invoke the first application programming interface and the user token is valid, generating the first application token.

8. The method according to claim 1, further comprising:
generating a first specific key and a second specific key, wherein the first specific key corresponds to the second specific key;
sending the second specific key to the first application;
in response to a disconnection condition occurred in the first application, receiving the second specific key sent by the first application after reconnecting to the authentication server;
in response to that the first specific key matches the second specific key, maintaining validity of the user token and the first application token.

9. The method according to claim 1, further comprising:
generating a user key according to the login information;
generating a first block according to the user key, the first identity, and the first key;
adding the first block to a blockchain, and sending the user key to the first application;
in response to receiving the user key, the first identity, and the first key from the first application, looking up the first block based on the user key, the first identity, and the first key to authenticate whether a use behavior and a user corresponding to the use behavior are valid,
in response to authenticating that the use behavior and the user corresponding to the use behavior are valid, recording the use behavior using the first application; and
generating a second block according to the use behavior, and adding the second block to the blockchain.

10. An authentication server, comprising: a storage circuit, storing a plurality of modules; and a processor, coupled to the storage circuit and accessing the modules to perform the following steps: receiving a login information from a first application; in response to authenticating that the login information is valid, generating a user token, and sending the user token to the first application; receiving a first request of the first application for invoking a first application programming interface, wherein the first request comprises the user token, a first identity of the first application, and a first key of the first application, wherein the first identity and the first key are assigned to the first application by the authentication server in response that the first application is registered on the authentication server; and in response to authenticating that the user token, the first identity, and the first key are valid, generating a first application token associated with the first application, and sending the first application token to the first application to authorize the first application to invoke the first application programming interface.

11. The authentication server according to claim 10, wherein the processor is further configured to:
send the user token to a second application, wherein the first application and the second application are installed on a smart device.

12. The authentication server according to claim 11, wherein the processor is further configured to:
receive a second request of the second application for invoking a second application programming interface, wherein the second request comprises the user token, a second identity of the second application, and a second key of the second application, wherein the second identity and the second key are assigned to the second application by the authentication server in response to that the second application is registered on the authentication server; and
in response to authenticating that the user token, the second identity, and the second key are valid, generate a second application token associated with the second application, and send the second application token to the second application to authorize the second application to invoke the second application programming interface.

13. The authentication server according to claim 10, wherein the processor is further configured to:
assign a first access role of multiple access roles for the first application according to information registered on the authentication server by the first application, wherein each of the access roles corresponds to permissions for invoking different application programming interfaces.

14. The authentication server according to claim 13, wherein the processor is further configured to:
obtain the first access role of the first application according to the first identity;
determine whether the first application has permission to invoke the first application programming interface according to the first access role;
in response to determining that the first application has permission to invoke the first application programming interface and the user token is valid, generate the first application token.

15. The authentication server according to claim 13, wherein an access level of the first access role is a first level, and the processor is further configured to:
receive a level change request from the first application;
change the access level of the first access role into a second level according to the level change request, wherein a permission for invoking an application programming interface of the second level is different from a permission for invoking an application programming interface of the first level.

16. The authentication server according to claim 15, wherein the processor is further configured to:
obtain the first access role and the access level of the first application according to the first identity;
determine, according to the first access role and the access level, whether the first application has permission to invoke the first application programming interface;
in response to determining that the first application has permission to invoke the first application programming interface and the user token is valid, generate the first application token.

17. The authentication server according to claim 10, wherein the processor is further configured to:

generate a first specific key and a second specific key, wherein the first specific key corresponds to the second specific key;

send the second specific key to the first application;

in response to a disconnection condition occurred in the first application, receive the second specific key sent by the first application after reconnecting to the authentication server;

in response to that the first specific key matches the second specific key, maintain validity of the user token and the first application token.

18. The authentication server according to claim 10, wherein the processor is further configured to:

generate a user key according to the login information;

generate a first block according to the user key, the first identity, and the first key;

add the first block to a blockchain, and send the user key to the first application;

in response to receiving the user key, the first identity, and the first key from the first application, look up the first block based on the user key, the first identity, and the first key to authenticate whether a use behavior and a user corresponding to the use behavior are valid, in response to authenticating that the use behavior and the user corresponding to the use behavior are valid, record the use behavior using the first application; and generate a second block according to the use behavior, and add the second block to the blockchain.

* * * * *